C. A. TOFFT.
LAWN MOWER.
APPLICATION FILED SEPT. 18, 1918.
1,338,199.
Patented Apr. 27, 1920.
3 SHEETS—SHEET 1.
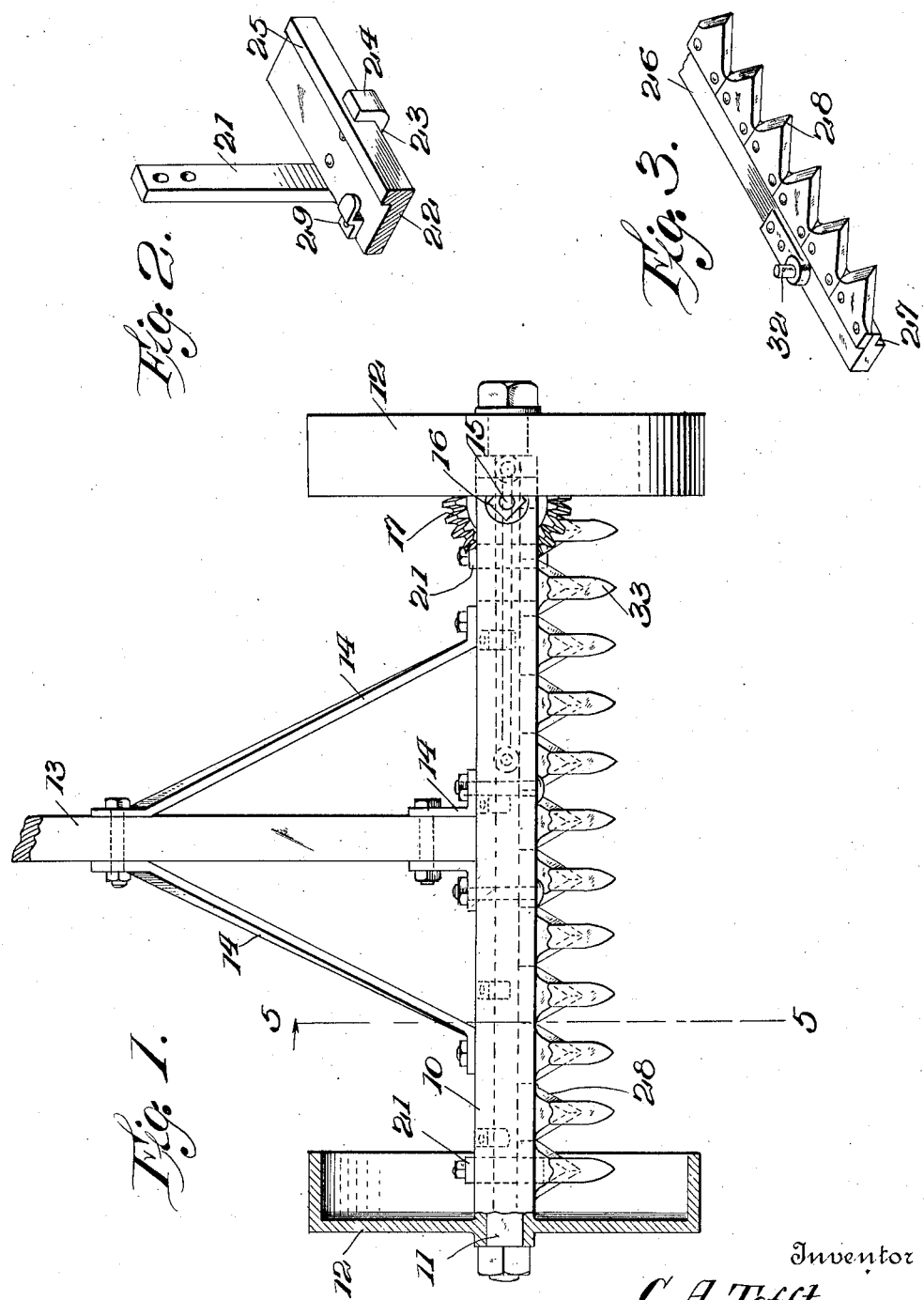
Inventor
C. A. Tofft
By
Lacey & Lacey, Attorneys C. A. TOFFT.
LAWN MOWER.
APPLICATION FILED SEPT. 18, 1918.
1,338,199.
Patented Apr. 27, 1920.
3 SHEETS—SHEET 2.
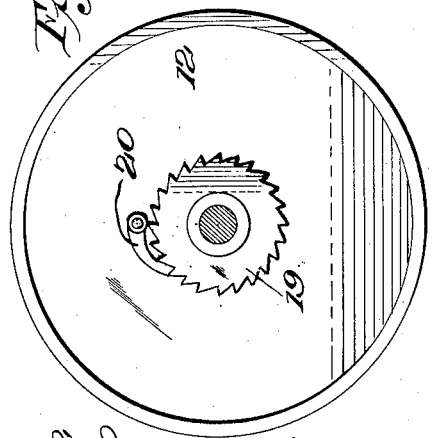
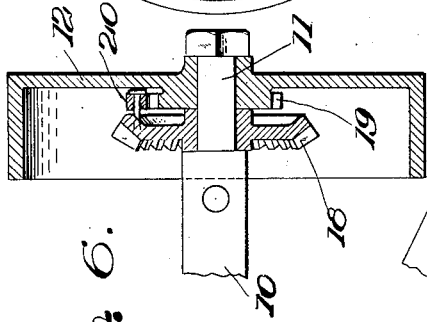
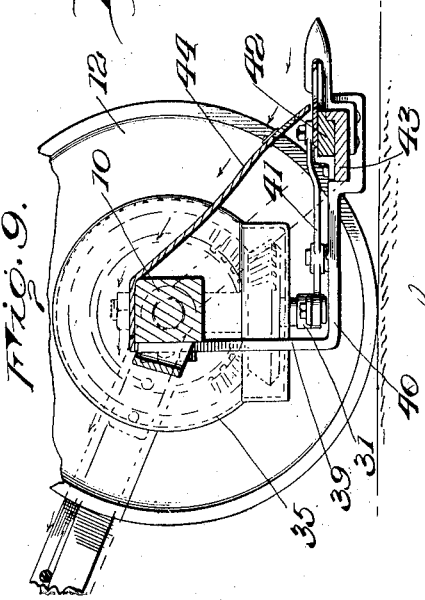
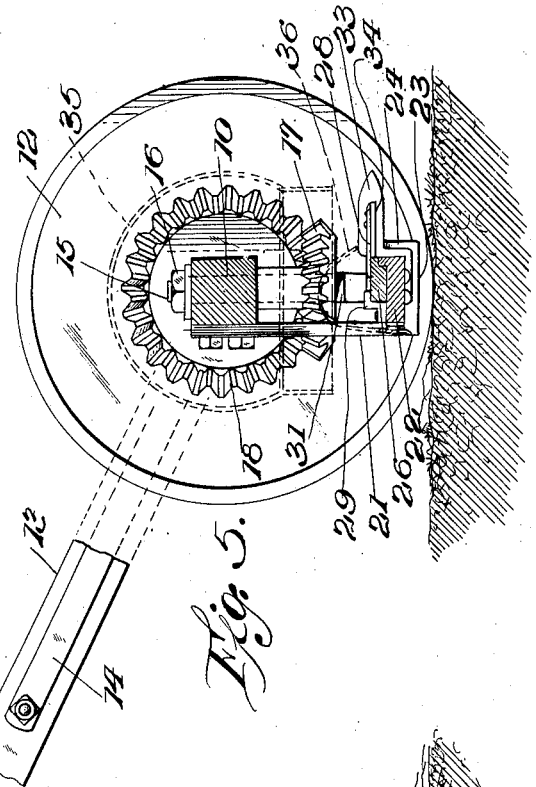
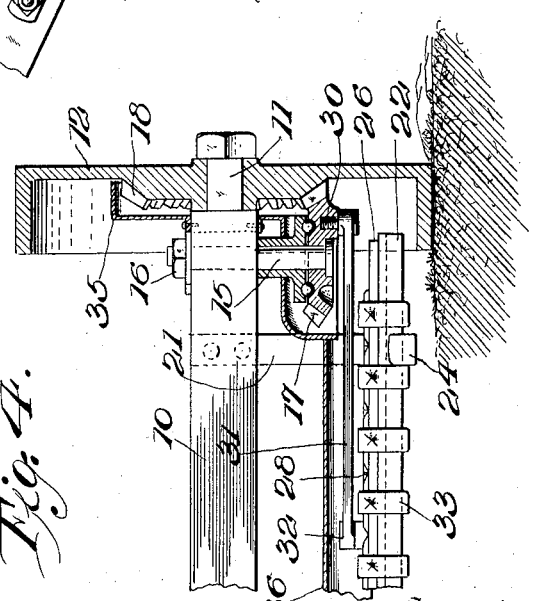
Inventor
C. A. Tofft
By
Lacey & Lacey
Attorneys

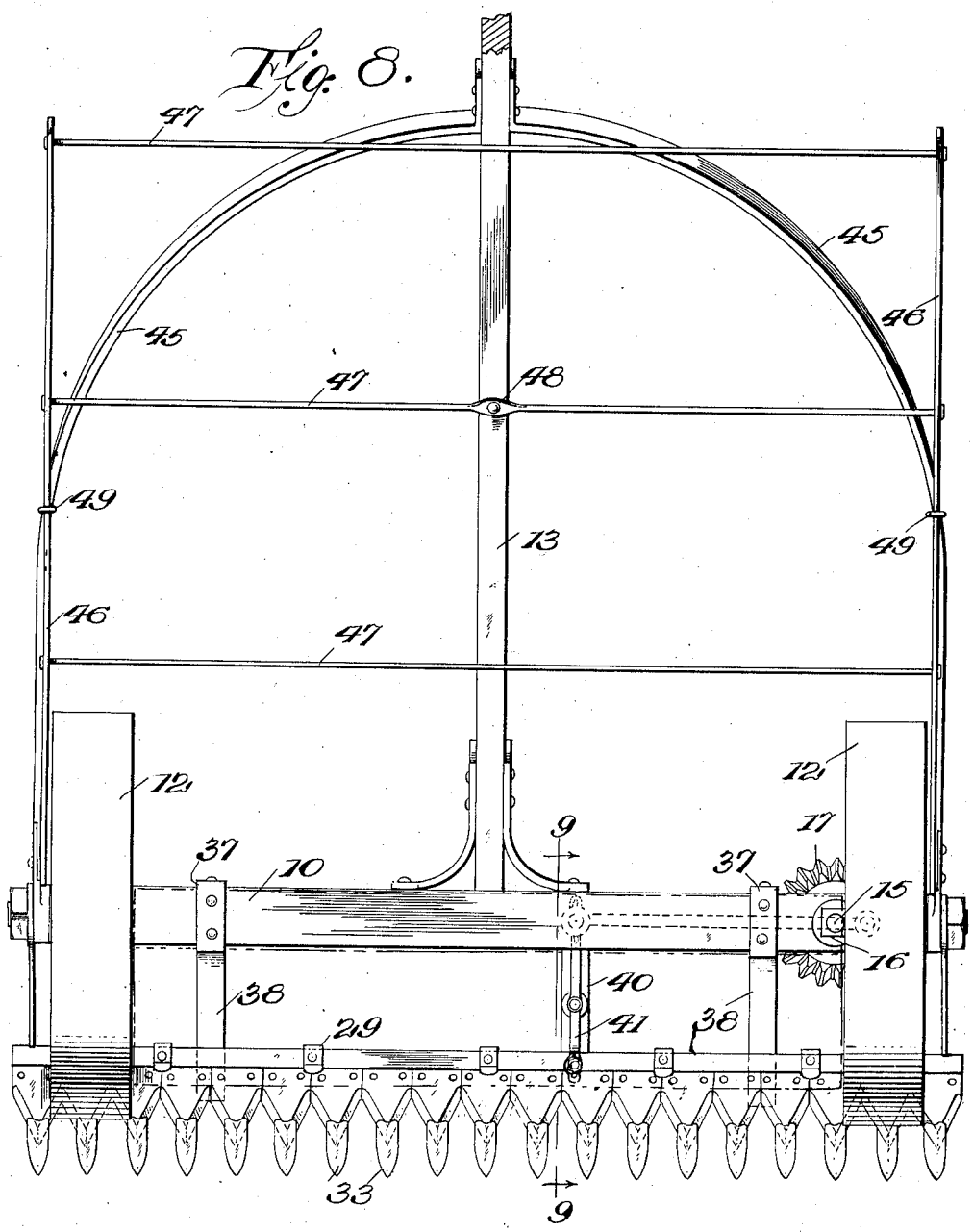

UNITED STATES PATENT OFFICE.

CECILIA A. TOFFT, OF MOUNT IDA, ARKANSAS.

LAWN-MOWER.

1,338,199.  Specification of Letters Patent.  Patented Apr. 27, 1920.

Application filed September 18, 1918. Serial No. 254,602.

*To all whom it may concern:*

Be it known that I, CECILIA AGNESS TOFFT, a subject of the King of Great Britain, residing at Mount Ida, in the county of Montgomery and State of Arkansas, have invented certain new and useful Improvements in Lawn-Mowers, of which the following is a specification.

This invention relates to improvements in mowers, and has for its objects to improve the construction and increase the efficiency and utility of devices of this character; to provide a device of this character which is compact, constructed of few parts and not liable to get out of order, and which may be manufactured at a comparatively small cost; and to provide means whereby the machine may be arranged for use as a lawn mower or weed cutter, or for harvesting light thin crops of grain.

With these and other objects in view, the invention consists in certain novel features as hereinafter shown and described and then specifically pointed out in the claims; and in the drawings illustrative of the invention—

Figure 1 is a plan view, partly in section of one form of the invention;

Fig. 2 is a perspective view of a portion of the sickle bar support;

Fig. 3 is a perspective view of a portion of the sickle bar and a plurality of the sickle knives;

Fig. 4 is a front elevation partly in section, of the improved device at the drive end;

Fig. 5 is a transverse section on the line 5—5 of Fig. 1, without the gear protecting hood;

Fig. 6 is a sectional detail illustrating another form of driving mechanism;

Fig. 7 is a side elevation of the drive wheel constructed as shown in Fig. 6;

Fig. 8 is a plan view of the machine arranged for harvesting grain;

Fig. 9 is a section on the line 9—9 of Fig. 8.

The improved device comprises an axle member 10 preferably square and with journals 11 at its ends to receive the traction wheels 12. A handle or tongue 13 is rigidly coupled to the axle 10 and secured against lateral movement by braces 14. Inserted through the axle 10 near one of the traction wheels is a stationary shaft 15 maintained rigidly in position by a clamp nut 16. At its lower end, the shaft 15 receives a bevel pinion 17 meshing with a bevel gear 18 integral with the adjacent wheel 12, as shown in Fig. 4, or separate therefrom as shown in Fig. 6.

In Figs. 6 and 7, the drive wheel 12 is shown arranged with a backing ratchet device comprising a ratchet wheel 19 integral with the wheel, and a pawl 20 carried by the gear 18. Either arrangement may be employed, as preferred.

Attached to the axle 10, near its ends, are hangers 21 and rigidly connected to the hangers is a supporting bar 22, the lower ends of the hangers being carried forward, as at 23, under the bar 22 and then turned upward, as at 24, whereby to firmly hold the bar against all movement.

The bar 22 is provided with a longitudinal rib 25 at its front edge and a sickle bar 26 is mounted for reciprocation upon the supporting bar 22, the front edge of the sickle bar being rabbeted, as at 27, to engage over the rib 25. Attached to the sickle bar are a plurality of knives 28 as shown most clearly in Fig. 3. Attached to the bar 22 are a plurality of guide stops 29 which bear over the rear edge of the sickle bar and coact with the rib 25 to hold the sickle bar in position during its reciprocation. The pinion 17 is provided with a crank pin 30 on which one end of a pitman 31 is pivoted, the opposite end of the pitman being pivoted at 32 to the sickle bar. A plurality of guard fingers 33 are attached to the under face of the bar 22, and each finger carries a fixed knife 34 over which the sickle knives operate to insure the effective cutting action.

It will be obvious that as the machine is pushed over the lawn by force applied to the tongue 13, the sickle bar will be reciprocated through the motion imparted thereto by the gear 18, pinion 17, and pitman 31, and the grass effectually clipped or severed uniformly.

The handle 13 is so attached to the axle that when held at the usual height at its rear end, the shaft 15 will be maintained in a vertical position with the support 22 directly beneath the axle, as shown clearly in Fig. 5, so that the cutter knives operate wholly between the lines of the wheels. The wheels thus act as protectors or guards to the sickle knives and prevent them coming in contact laterally with obstructions, the guard fingers turning aside small obstructions in their direct path in the usual manner.

The improved device is simple in construction, can be inexpensively manufactured, and operates effectually for the purpose described.

A hood or gear casing 35 is preferably arranged over the gears to protect them from dust and the severed grass, and a hood or shield 36 is secured to supporting bar 22 and rises over the same to the guard fingers so that the cut grass cannot lodge on the sickle and clog the same but will be directed under the axle and fall to the ground in rear of the cutter.

If it be desired to cut a light thin crop of wheat or other short grain, the hangers 21 and the parts carried thereby are removed and hangers 37 are substituted, the latter being of the same construction as the first-mentioned hangers but having longer horizontal arms, as shown at 38 in Fig. 8. An intermediate hanger 39 is also secured to the axle and upon the forwardly projecting base portion 40 of said hanger is fulcrumed a lever 41, the rear end of said lever being pivoted to the pitman 31 and the front end thereof being pivoted to the sickle bar 42 which is longer than the sickle bar 26 but is otherwise identical therewith. The supporting bar 43 which is secured to the hangers 37 is identical with the supporting bar 22, except in the matter of length, it being noted that, in the arrangement shown in Figs. 8 and 9, the cutter projects in front of the wheels 12.

A shield or apron 44 is secured to the axle and extends down to the cutter so that the cut grain can not drop between the cutter and the axle but will be directed over the axle and may be caught upon a frame or basket provided upon the handle. As shown most clearly in Fig. 8, large curved braces 45 are mounted upon the ends of the axle and connected to the handle and upon these braces and the handle I place a frame consisting of side bars 46 and cross bars 47, a set screw 48 being inserted through one of the cross bars into the handle and any convenient form of hook or stay 49, being employed to couple the side bars to the braces whereby displacement of the frame will be prevented.

It will be readily understood that as the machine is pushed, the grain will be cut and will fall over to and upon the frame and the handle where it may collect until it is sufficient in quantity to form a bundle when it may be discharged to the ground to be subsequently gathered and tied.

Having thus described the invention, what is claimed as new is:

1. In a device of the class described, an axle held from rotation, traction wheels rotatable on said axle, hanger devices fixed to and depending from said axle, a supporting member carried by said hangers normally in vertical alinement with and below the axle, a sickle bar movable upon said supporting member and including sickle knives, and means supported by one end of the axle for transmitting the motion of the adjacent traction wheel to said sickle bar.

2. In a device of the class described, an axle held from rotation, traction wheels rotatable on said axle, a gear on the inner face of one of said traction wheels, a shaft carried rigidly by one end of said axle and maintained normally in pendent vertical position, a pinion rotatable on the lower end of said shaft and engaging said gear, hanger devices fixed to said axle, a supporting member carried by said hangers and maintained normally in vertical alinement with and below said axle, a sickle bar movable upon said supporting member and including sickle knives, said sickle bar and its knives operating wholly between the traction wheels, and connecting means between said pinion and the sickle bar to transmit motion to the bar.

3. The combination of an axle held against rotation, hangers secured rigidly to the axle and depending vertically therefrom and having forwardly projecting members at their lower ends, traction wheels mounted on the axle, a supporting bar carried by the forwardly projecting members of the hangers, a cutter slidably mounted on said supporting bar, and means actuated by one of the traction wheels to reciprocate the cutter.

4. The combination of an axle, a handle secured thereto, a cutting mechanism suspended on the axle, means for operating said mechanism, curved braces mounted on the ends of the axle and secured to the handle, side bars resting on and connected to the braces, and cross bars connecting the side bars and resting on the braces and the handle and secured to the handle.

5. The combination of an axle held against rotation, hangers secured rigidly thereto and depending vertically therefrom, a supporting bar carried by the lower ends of said hangers and having a longitudinal rib at its front edge, a sickle bar slidably mounted on said supporting bar and having a seat engaging against and over said rib, guides at the rear edge of the supporting bar engaging over the rear edge of the sickle bar and coöperating with the longitudinal rib at the front edge of the supporting bar, and means at one end of the axle for operating the sickle bar.

6. The combination of an axle held against rotation, a handle secured directly to the axle, traction wheels mounted on the axle, hangers secured rigidly to and depending from the axle, a supporting bar secured to the lower ends of said hangers in the vertical plane of the axle, a sickle bar slidably mounted on the supporting bar, interengaging means on the supporting bar and the sickle bar whereby to retain the sickle bar in the plane of the axle, a stationary shaft fixed in the axle and depending therefrom, a pinion on the lower end of the stationary shaft actuated by the adjacent traction wheel, and a pitman connecting said pinion with the sickle bar.

In testimony whereof I affix my signature.

CECILIA A. TOFFT. [L. S.]